United States Patent [19]

Zahr

[11] Patent Number: 4,501,876
[45] Date of Patent: Feb. 26, 1985

[54] FILM-FORMING POLY(CONJUGATED POLYMETHINE-TYPE)DYE

[75] Inventor: George E. Zahr, Wilmington, Del.

[73] Assignee: E. I. Du Pont de Nemours and Company, Wilmington, Del.

[21] Appl. No.: 585,107

[22] Filed: Mar. 1, 1984

Related U.S. Application Data

[63] Continuation-in-part of Ser. No. 514,890, Jul. 18, 1983, abandoned.

[51] Int. Cl.³ ............................................. C08G 12/08
[52] U.S. Cl. ...................................... 528/232; 430/338;
524/104; 524/173; 524/233; 525/420; 525/540;
528/269; 528/266
[58] Field of Search ............... 528/232, 266, 269, 245;
524/104, 173, 233; 430/338; 525/420, 540

[56] References Cited

U.S. PATENT DOCUMENTS

| | | | |
|---|---|---|---|
| 3,314,073 | 4/1967 | Becker | 346/76 |
| 3,419,584 | 12/1968 | Elslager et al. | 260/397.6 |
| 3,474,457 | 10/1969 | Becker | 346/76 |
| 3,660,163 | 5/1972 | Moser | |
| 3,660,163 | 5/1972 | Moser | 136/83 |
| 3,723,121 | 3/1973 | Hauser | 96/27 |
| 3,987,011 | 10/1976 | Sirokina et al. | 528/232 |
| 4,023,185 | 5/1977 | Bloom et al. | 346/135 |
| 4,048,148 | 9/1977 | Morgan | |
| 4,097,895 | 6/1978 | Spong | 358/128 |
| 4,101,907 | 7/1978 | Bell et al. | 346/135 |
| 4,122,070 | 10/1978 | Morgan | 528/266 X |
| 4,172,937 | 10/1979 | Suematu et al. | 528/232 |
| 4,178,430 | 12/1979 | Bilow | 528/266 X |
| 4,190,843 | 2/1980 | Spong | 346/1.1 |
| 4,204,216 | 5/1980 | Heeger et al. | 357/8 |
| 4,218,689 | 8/1980 | Bloom et al. | 346/135.1 |
| 4,219,826 | 8/1980 | Bloom et al. | 346/135.1 |
| 4,222,903 | 9/1980 | Heeger et al. | 252/518 |
| 4,241,355 | 12/1980 | Bloom et al. | 346/135.1 |
| 4,242,689 | 12/1980 | Bloom et al. | 346/135.1 |
| 4,297,502 | 10/1981 | Herrman et al. | 528/292 X |
| 4,315,269 | 2/1982 | Bloom et al. | 346/135.1 |
| 4,321,114 | 3/1982 | MacDiarmid et al. | 204/2.1 |
| 4,360,583 | 11/1982 | Engler et al. | 430/270 |
| 4,360,660 | 11/1982 | Watarai et al. | 528/266 |
| 4,360,908 | 11/1982 | Howe et al. | 369/109 |
| 4,423,203 | 12/1983 | Corvan et al. | 528/266 |

OTHER PUBLICATIONS

Bartolini, J. Vac. Sci. Technology, vol. 18, No. 1, Jan.-/Feb. 1981, p. 70.
Marechal, E., Pure & Applied Chemistry, vol. 52 (1980), pp. 1923–1928.
Marechal, E., Progress in Organic Coatings, 10 (1982), pp. 251–287.

*Primary Examiner*—Lucille M. Phynes

[57] ABSTRACT

A poly(conjugated polymethine-type)dye which is the polycondensation reaction product in the presence of strong protic acid of an aromatic polyamine and a dicarbonyl compound. These polymers are useful in the fabrication of optical recording elements and in other electronic applications.

23 Claims, No Drawings

FILM-FORMING POLY(CONJUGATED POLYMETHINE-TYPE)DYE

CROSS REFERENCE TO RELATED APPLICATION

This application is a continuation-in-part of U.S. patent application Ser. No. 514,890 filed July 18, 1983, now abandoned.

FIELD OF INVENTION

The invention is directed to novel polymers which are suitable for use in optical recording elements.

BACKGROUND OF THE INVENTION

In response to the demand for more reliable and higher capacity data storage and retrieval systems, there is considerable activity in the research and development of so-called optical disk recording systems. These systems utilize a highly focused modulated beams of light, such as a laser beam, which is directed onto a recording layer which is capable of absorbing a substantial amount of the light. The heat thusly produced causes the light-absorbing material in the areas struck by the highly focused laser beam to change chemically and/or physically, thus producing a concomitant change in optical properties, e.g., transmissivity or reflectivity in the affected area. For readout, the contrast between the amount of light transmitted or reflected from the unaffected parts of the absorbing layer and from the marked areas of the layer is measured. Examples of such recording systems are disclosed in U.S. patents throughout the literature and in numerous U.S. patents such as U.S. Pat. Nos. 3,314,073 and 3,474,457. In recording data, a rotating disk having a light-absorptive recording layer is exposed to modulated radiation from a laser source. This radiation is passed through a modulator and appropriate optics and the highly focused laser beam is directed onto the disk which forms by chemical and/or physical reaction of the light-absorbing layer a series of very small marks along a circular path within the light-absorptive layer. The frequency of the marks is determined by the modulator inputs. Using laser beams with a diameter of 1 $\mu$m or less, data can be stored at a density of $10^8$ bits/cm$^2$ or higher.

The simplest optical disk medium consists merely of a dimensionally stable solid substrate on which is coated a thin layer of light-absorptive material such as a metal layer. When the light-absorptive layer is struck by an intense beam of coherent light, such as from a laser source, the light-absorptive material is vaporized, thermally degraded, and/or otherwise physically and chemically modified, thereby producing a very small marked area which exhibits different transmissivity or reflectivity than the adjacent unmarked layer.

The desired properties of optical recording media are (1) high sensitivity, (2) high signal-to-noise ratio (SNR), (3) high tolerance to material variation, contaminants and other defects, and (4) high archival stability after extended storage and/or recording and readout (see Bartolini, *J. Vac. Sci. Technology*, Vol. 18, No. 1, Jan/Feb 1981, p. 70). Based upon these criteria, a considerable amount of research has been and continues to be carried out directed to obtaining the best possible disk materials. In particular, a majority of the work done up to this time on materials for the light-absorptive or recording layer has been directed to thin films of metals and chalcogenides such as tellurium, tellurium alloys, rhodium, bismuth, indium, lead, aluminum, platinum, nickel, titanium and silver. Of these, by far the greatest amount of work has been directed to the use of tellurium and its alloys.

In addition, considerable effort has been directed to finding suitable organic-based light-absorptive materials. These have been largedly metal/polymer composites or dye/polymer composites. In the former case, finely divided metal particles are dispersed in an organic polymer medium. In the latter case, a dye is dissolved in, or finely divided pigment particles are dispersed in, an organic polymer medium.

The many issued patents which are directed to various dye and dye/polymer dispersions are indicative of the high level of interest in such materials. Several patents disclose the idea of using as an absorptive medium a thin layer of dye. e.g., U.S. Pat. Nos. 4,023,185, 4,097,895, 4,101,907, 4,190,843, 4,218,689, 4,219,826, 4,241,355, 4,242,689 and 4,315,269. Other patents disclose the use of dispersions of dye in an organic polymer medium. For example, U.S. Pat. No. 3,314,073 to Becker discloses the use of dyed gelatin or India ink and U.S. Pat. No. 4,360,908 to Howe et al. discloses the use of (dialkylaminobenzylidene) ketone dyes dispersed in a cellulose nitrate binder. In a similar manner, U.S. Pat. No. 3,723,121 to Hauser discloses a process for laser beam recording using colored thermochromic materials which, when heated with the laser beam, change to a color which transmits the laser beam. The materials are used either by themselves or dispersed in finely divided form in a film-forming organic polymer such as polyvinyl alcohol and/or gelatin.

In a different vein, U.S. Pat. No. 4,360,583 to Engler et al. is directed to a process for producing an optical record by UV exposure through a photomask. The light-absorptive layer is a film comprising functionally substituted tetraheterofulvalene and liquid halocarbon which co-react upon exposure to light. The photoreacted film is then solvent developed to produce contrasting light-absorptive image areas, which can be read by a laser beam.

In still another vein, polymeric materials having electrical conductivity in the semiconductive region are known. These are generally used in a doped form whereby the electrical properties are modified. Such materials are disclosed in U.S. Pat. No. 4,222,903.

Despite the great amount of research and development in this area of technology and the great number of materials tested, none of these has exhibited the capability of being formed into optically suitable imaging layer with both low cost of manufacture and with high performance reliability. In particular, the goals of economically achieving good sensitivity, high signal-to-noise ratio and exceptionally smooth surface characteristics have heretofore not been achieved.

BRIEF DESCRIPTION OF THE INVENTION

The invention is therefore directed to a film-forming polymeric dye which is useful as the light absorptive layer of optical recording elements, but which overcomes many of the disadvantages which have attended the use of dyes and dye/polymer dispersions in such applications. More particularly, the invention is directed to a film-forming poly (conjugated polymethine-type) dye which is the polycondensation reaction product in the presence of strong protic acid of an aromatic polyamine and a dicarbonyl compound corresponding to the formula:

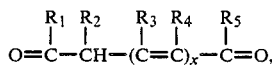

in which $R_1$ and $R_5$ are independently selected from the group consisting of —H, $C_{1-4}$ alkyl, phenyl, $C_{7-12}$ aralkyl, $C_{7-12}$ alkaryl and $C_{5-8}$ cycloalkyl and, when $R_1$ and $R_5$ are combined, $C_{2-5}$ alkylene, thus forming a $C_{5-8}$ member ring, $R_2$, $R_3$ and $R_4$ are independently selected from the group consisting of —H, $C_{1-3}$ alkyl and halogen, and $\chi$ is either 0 or an integer of 1 to 3 designating an ethylenically unsaturated moiety. When $\chi$ is 2 or 3, this moiety may or may not be the same.

DETAILED DESCRIPTION OF THE INVENTION

1. Monomers

The polymers of the invention are prepared by the condensation reaction in solvent medium of the above-described aromatic polyamine or salt thereof with the dicarbonyl compound in the presence of a strong acid. As used herein, the term "polyamine" means an aromatic compound containing at least 2 reactive amine groups. Chromophoric aromatic polyamines are preferred. The highly chromophoric polymer which results from this reaction contains a highly conjugated polymethine-type chromophoric system as an integral part of its backbone structure. The polymethine-type structures referred to here may in some cases be referred to as iminium or amidinium ion moieties. Such groups can be found in cyanine-type dyes. The reaction and resulting polymer can be represented by the following simplified equation:

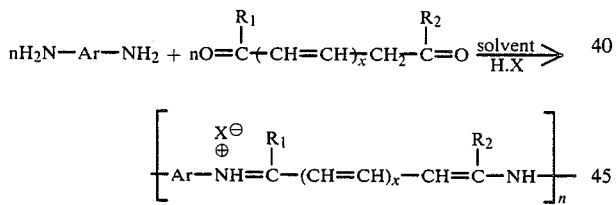

Suitable polyamines for use in the invention include the following:
p-phenylene diamine
4,4'-diaminobenzophenone
Solvent Green 3
Direct Black 22
1,4-diamino anthraquinone
New Methylene Blue N
Oil Blue N
Pararosaniline Base
Thionin
Acid Black 48
Cresyl Violet Acetate
4,4'-diaminodiphenylamine
Solvent Blue 59
N,N,N',N'-tetrakis (p-aminophenyl)-p-phenylenediamine
Acid Fuchsin
Acid Blue 161
Acid Blue 45
Acid Alizarin Violet N
Nigrosine
2,7-diamino-9-fluorenone
3,6-diamino-9-fluorenone
3,6-diaminoacridine
Substituted 6,6-diphenyl-6H-chromoeno [4,3-6]indols and carbonium ion salts thereof
3,6-diamino-9-hydroxy fluorene analog of triphenylmethane
3,6-diamino-12-dimethylamino fluorene analog of triphenylmethane, HCl.

The absorption spectrum of the polymer can be tuned to the wavelength of the write and read laser beams with which it is used by selection of different aromatic polyamine configurations.

With regard to the dicarbonyl reaction component, it is preferred for reasons of both reaction rate and economic availability to utilize those in which $\chi$ is 0 or 1 and in which $R_1$ is —H. Thus, it is preferred to use aliphatic dialdehydes such as malonaldehyde generated from precursors thereof such as bis(dimethylacetal). Other dicarbonyls which can be used in the invention include 1,3-cyclohexanedione, indan-1,3-dione, 1,3-cyclopentanedione, 1,3-cyclopentenedione and 2-methyl derivatives thereof.

2. Strong Acid

The third essential reactant is the strong acid. While, in theory, any strong acid can be used to carry out the polymerization reaction, in fact only very strong acids are suitable in the invention for the reason that other acids do not give sufficiently high molecular weight. Therefore, as used herein, the term "strong acid" means protic acid having pKa values of below 0. Strong acids having pKa values below —5 are preferred and those having pKa values below —10 are still further preferred. Suitable strong acid include the following, of which fluorosulfonic and trifluoromethanesulfonic acids are especially preferred.

| Strong Acid | pKa |
|---|---|
| HClO$_4$ | —10 |
| HI | —10 |
| H$_2$SO$_4$ | ca. —10 |
| Aromatic Sulfonic Acids | —7 |
| HCl | —7 |
| FSO$_3$H | > —12 |
| CF$_3$SO$_3$H | > —12 |
| CF$_3$CO$_2$H | 0 |

Though strong acids are essential for the polymerization step, virtually any acid can be added when the condensation polymerization has been completed in order to change the form of the salt.

3. Solvent

In carrying out the condensation polymerization reaction, it is necessary that both the monomers and resultant polymers be completely dissolved in the solvent medium. For this purpose, it is necessary to use a highly polar aprotic solvent, preferably one having an atmospheric boiling point below 250° C. and still more preferably below 200° C. It is desirable to use moderately volatile solvents so that they can be removed by mildly heating the reaction mixture or solution of polymer in solvent to vaporize the solvent. It is also preferred that such solvents be soluble in water-soluble solvents such as methanol and dimethyl ketone so that the polymerization solvent can be removed by extraction as well. Suitable reaction solvents include dimethylsulfoxide (DMSO), N,N-dimethylformamide (DMF), hexamethyl phosphonamide (HMPA), dimethylacetamide (DMAC) and N-methylpyrrolidone (NMP).

4. Process Variables

It is preferred that the polymerization reaction system be heated to raise the reaction rate. It is also preferred to use temperatures no higher than about 150° C. However, reaction temperatures below about 100° C. are especially preferred for most polymerization systems of this type.

The time of the polymerization reaction is not very critical, but must be adequate to establish the film-forming character of the polymer. If the reaction time is sufficiently long, gelation may take place, which indicates that the molecular weight of the polymer is high. The exact times within which good film-forming properties can be obtained will vary widely depending on whatever polymerization system and reactants are being used. Nevertheless, suitable operating limits can readily be established by anyone skilled in the art.

To obtain adequate film-forming properties, it is necessary that the inherent viscosity of the polymers (measured in DMSO at 25° C.) be at least 0.2 and preferably at least 0.3. On the other hand, the molecular weight, as indicated by inherent viscosity, must not be so high as to make it insoluble in the polymerization solvent. Thus the maximum inherent viscosity for the polymers of the invention will vary according to what solvent is used for the polymerization reaction. As used herein, the term "film-forming" means that the polymeric dye is solid or semisolid at room temperature and is capable of being formed into a coherent film by conventional coating or extrusion methods.

The preparation of polymeric dyes generally by copolycondensation is described by E. Marechal in *Pure & Applied Chemistry*, Vol. 52 (1980), pp. 1923-1928 and in "Polymeric Dyes—Synthesis, Properties and Uses", *Progress in Organic Coatings*, 10 (1982), pp. 251-287. In addition, Eslager et al. in U.S. Pat. No. 3,419,584 disclose low molecular weight liquid condensation polymer salts of a 4,4'-sulfonyldianiline compound with a dialdehyde which are antimalarial and antileprosy agents. The dianiline reactant is chromophoric, but the resultant polymers are liquid and therefore not film-forming.

The following terms are used herein in accordance with the definitions given in *Hackh's Chemical Dictionary*, 4th Edition, McGraw-Hill Book Company, New York (1969):

"Auxochrome" is a radical that intensifies the color of a chromophore or develops a color from a chromogen.

"Bathochrome" is an organic radical which displaces the absorption spectrum of an organic molecule toward the red.

"Chromogen" is a structural arrangement of atoms in many colored organic substances, e.g., —N=N—.

It appears that in all cases, equimolar amounts of the monomers are preferred for the polymerization reactions. However, up to a 10% molar excess of the dicarbonyl compound can be used with triamines and tetramines. Only a small amount of the protic acid is required to catalyze the condensation polymerization reaction. However, to form the soluble polymeric salt, at least a molar equivalent is needed. Though water is not essential to the polymerization reaction, it is preferred to have at least a molar equivalent of water present for hydrolysis when malonaldehyde (dimethylacetal) is used as the dicarbonyl reactant. It is, of course, essential that the polymerization reaction be carried out with good mixing of all components.

The polymer salts of the invention can also be treated with oxidants such as $AgAsF_6$ to increase the absorptivity of the polymer salt at longer wavelengths of light. They can also be treated with electron acceptor charge transfer complexes to produce a similar increase in absorptivity. Alternatively, stable charge-transfer complexes can be made with such electron acceptors as tetracyanoethylene (TCNE) or tetracyanoquinodimethane (TCNQ) and its derivatives. In particular, the TCNQ complexes exhibit intense absorption bands between 800 and 900 nm. Therefore, they are useful with near-IR diode laser sources.

The polymers of the invention frequently exhibit electrical conductivity in the semiconductive region and they are chemically stable and have low toxicity as well.

The invention is illustrated by the following examples.

EXAMPLES

EXAMPLES 1-5

A. Polymerizaton

The reaction to form the polymeric dye is a condensation between an aromatic diamine and 1,3-propanedialdehyde (malonaldehyde) which results in a highly conjugated polymethine-type chromophoric system, for example as follows:

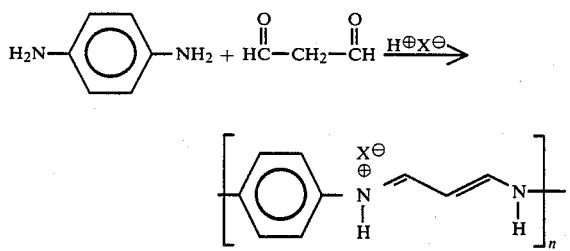

The absorption spectrum of the polymer can be tuned to the wavelength of the imaging and reading lasers by varying the structure of the aromatic diamine. Polymers having absorption in the visible and infrared wavelength regions have been prepared. The aromatic diamines which have been used in this reaction are listed above in the discussion of light-absorption materials.

The reaction is carried out in dimethylsulfoxide (DMSO), N,N-dimethylformamide (DMF), N-methylpyrrolidone (NMP) or a mixture of these solvents, chosen because they appear to be the best solvents for the polymer formed in the reaction. Allowing the product to remain in solution gives higher molecular weights. A few grams (1-25 g) of the aromatic diamine is dissolved in the solvent in a 500 ml resin kettle fitted with $N_2$ inlet and outlet and a stirring blade. After a thorough $N_2$ purge, the malonaldehyde (equimolar quantity) is added. The malonaldehyde is added as the bis(dimethylacetal) since malonaldhyde itself is highly unstable. The acetal (Aldrich, BP=183° C., $n_D^{20}$=1.4081, d=0.997, combustible liquid) readily decomposes to the aldehyde in the presence of acid. An equimolar equivalent of trifluoromethanesulfonic acid (CF$_3$SO$_3$H, Aldrich, BP 163° C., n$_D^{20}$=1.327, d=1.696, hygroscopic, corrosive) is added to the reaction mixture using a syringe after malonaldehyde has mixed well into the solution. The resin kettle is immersed into a steam bath for 4–48 hours. The viscosity of the reaction mixture typically increases as the reaction proceeds. In some cases, a highly gelatinous mixture is obtained. The quantity of solvent is chosen to make up a 5–10% (by weight) reactants solution.

A second method has been used to control the release of malonaldehyde from the acetal form during the course of the reaction. In this second method, the aromatic diamine and acid are dissolved in a solvent (usually DMSO). Malonaldehyde bis(dimethylacetal) is dissolved in ~50 ml solvent and placed in a dropping funnel and this mixture was added to the slurried, steam-heated reaction mixture over a period of ~4 hours. The reaction was continued until polymerization occurred. In the Examples which follow, all of the polymeric dyes were made by one of these methods.

B. Purification

The most extensive studies have been carried out on the polymer (II), prepared from thionin (I) and malonaldehyde.

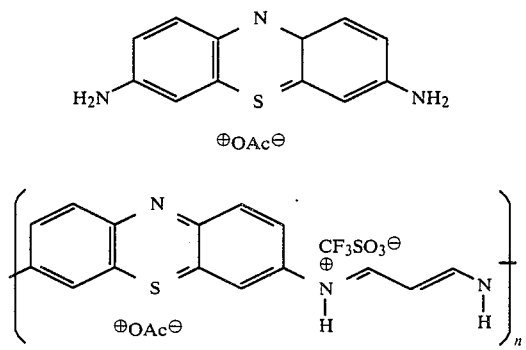

Thus, the following discussion refers to this thionin-containing polymer unless otherwise noted.

Thionin was purchased from Aldrich Chemical Co. in the form of the acetate salt (94–97% purity). A chloride salt can be used but the polymer formed is less soluble in dimethylsulfoxide. When thionin acetate is used in the polymerization, the reaction mixture forms a gelatinous mass after ~16 hours. An interesting property of this polymer gel is that when it is exposed to the laboratory atmosphere (after polymerization under nitrogen), the gel rapidly liquifies. Apparently the dimethylsulfoxide absorbs enough water to reduce substantially the mixture's viscosity. Gelation may be partly due to electrostatic interaction between the charged polymer chains and therefore water may interrupt this interaction. The film-forming characteristics of the product were tested by placing a few drops of the reaction mixture on a glass slide and removing the solvent by heating slowly on a hotplate. A highly reflective film with a brownish sheen was obtained. The film was brittle but had good adhesion to glass. Films stored in an oven (~125° C.) for several months showed no noticeable loss of reflectance or physical properties.

The product contained water-soluble impurities which were easily leached from the polymer by conventional aqueous extraction techniques. The polymer was purified by precipitation in distilled water. A quantity of the reaction mixture (in DMSO) was poured into an excess of distilled water, while mixing in a Waring blender. The solids were suction filtered, reblended and filtered again. This procedure was repeated until the filtrate was clean. After air drying, the solids, though readily soluble in conc. H$_2$SO$_4$, did not rapidly redissolve in DMSO. Significant redissolution required prolonged periods of milling in dilute solution. After all the solid redissolved (~4–6 weeks), the solution was filtered through a series of Millipore filters (10, 5, 1, 0.5 μ) or a 0.2 μm polypropylene transverse flow filter in preparation for film casting. Avoiding polymer drydown may prevent crosslinking and increase ease of redissolution.

EXAMPLE 2—Film Coating

A. Film Casting for Laser Imaging

Films were cast from purified and unpurified polymer solutions in dimethylsulfoxide by spin coating onto 2-inch by 3-inch glass slides. Film thicknesses were easily varied from fractions of a micron to several microns by adjusting the coating solution viscosity (≦~15 Poise) and spinning rate. A Headway Research, Inc., Model EC101-CB15 photoresist spinner was used for all spin coating operations. The more viscous solutions required up to 3000 rpm to obtain a uniform film greater than 1 micron thick. An infrared (IR) lamp dried the film while spinning.

B. Laser Marking of Polymer Films

Samples were prepared for laser imaging by spin coating a small portion of a DMSO/polymer solution onto glass microscope slides (2 inch×3 inch×1 mm). Polymer solutions with viscosities between 1 and 15 Poises gave approximately 10 μm thick films at 2000–3000 rpm. Films on glass slides were tested for imaging sensitivity and readout capability using pulsed Ar+ (488 nm) and HeNe (633 nm) lasers capable of delivering up to 33mW and 5mW, respectively, to a sample surface. Samples were mounted on a computer-driven X-Y translation table and moved at a speed of 400 microns/second beneath an incoming laser pulse train (variable up to 100 μsec pulses; spaced ~10 msec apart) which produced a linear array of images (typically pits). Readout was accomplished using reduced power (≦1 mW) at the writing wavelength. Images were detected by a decrease in light intensity reflected back to a photodetector. Reflectance of the polymer film surface ranged from 5–18% and the reflectance in the imaged area ranged from 0–5%.

Typical results for several polymers are summarized in Table 1 below:

TABLE 1

| Laser Marking of Polymeric Dye Films | | | | |
|---|---|---|---|---|
| Polymer Absorptivity (λmax) | Laser Type | % Reflect. at Laser Wave Length[1] | Minimum Laser Pulse Width for Detection of Image Using Opt. Microscope (800X) | Write Laser Power at Sample Surface |
| 400 nm (633 nm) | HeNe | 15% | 10 μsec | 3.5 mW |

TABLE 1-continued
Laser Marking of Polymeric Dye Films

| Polymer Absorptivity (λmax) | Laser Type | % Reflect. at Laser Wave Length[1] | Minimum Laser Pulse Width for Detection of Image Using Opt. Microscope (800X) | Write Laser Power at Sample Surface |
|---|---|---|---|---|
| [Structure: poly(phenylene-NH-CH=CH-CH=N-H) with FSO$_3^\ominus$ counterion, N$^\oplus$]$_n$ | | | | |
| 490 | HeNe | 18% | 1 μsec | 3.5 mW |
| [Structure: poly with phenylene-NH-phenylene-NH-phenylene-N$^\oplus$H-CH=CH-CH=N-H, CF$_3$SO$_3^\ominus$]$_n$ | | | | |
| 550 | HeNe | 12% | 700 nsec | 2–5 mW |
| [Structure: poly containing NH$_2^\oplus$Cl$^\ominus$ quinoid diphenylmethylene unit with N$^\oplus$H-CH=CH-CH=N-H, CF$_3$SO$_3^\ominus$]$_n$ | | | | |
| 630 nm | HeNe | 15% | 300 nsec | 2.5 mW |
| [Structure: phenothiazine-type unit with $^\oplus$OAc$^\ominus$, linked to N$^\oplus$H-CH=CH-CH=N-H, CF$_3$SO$_3^\ominus$]$_n$ | | | | |
| 630 nm (488 nm) | Ar$^+$ | 15% | 50 nsec | 33 mW |
| [Structure: phenothiazine-type unit with $^\oplus$OAc$^\ominus$, linked to N$^\oplus$H-CH=CH-CH=N-H, CF$_3$SO$_3^\ominus$]$_n$ | | | | |

[1] 633 nm for HeNe; 488 nm for Ar$^+$

Imaging sensitivity was very reproducible and was not noticeably affected by thickness variations. Readout of imaged samples was accomplished by rescanning a line array of pits with laser power reduced to 100–800μ watt. The signal from the reflected light gathered by a photodetector was displayed on a scope and printed out on an X-Y recorder. Even short pulse widths gave good contrast between the unimaged background and imaged pit. Readout response was also very reproducible from one sampler to another.

Stability of imaged samples was tested on a hot-stage microscope by focusing on a sequence of pits at room temperature and then examining the pits at various temperatures at a heating rate of 5° C./min. The pits remained clearly visible and apparently unharmed as the sample was heated to 250° C. and then cooled back down to room temperture. The only noticeable effect of the heat treatment was sublimation of some material on the sample surface as the temperature was elevated. This material is believed to have been unreacted aromatic diamine. However, at 250° C., this sublimation ceased. Nevertheless, the sample was still highly reflective after the heat treatment.

EXAMPLE 6

A reaction system was prepared comprising 2.81 g (0.0094 mole) of pure 4,4'-diaminodiphenylamine sulfate and 1.55 g (0.0094 mole) of malonaldehyde bis(dimethylacetal) in a solution of 75 ml of dimethylformamide and 75 ml of dimethylsulfoxide under a nitrogen atmosphere. Steam heating (about 100° C.) and constant stirring enhanced the dissolution. Upon complete dissolution, 1.02 g (0.0068 moles) of trifluoromethanesulfonic acid was added dropwise followed by 0.45 g (0.0045 mole) of fluorosulfonic acid with continued heating and stirring. After 30 minutes a sample was drawn by a dropper and cast on a glass slide. The slide was heated over a hot plate (80° C.) for 20 minutes. A metallic green film formed which could be peeled off the glass slide. Its conductivity at room temperature (23° C.) and 0% relative humidity was $1.1 \times 10^{-2}$ ohm$^{-1}$ cm$^{-1}$.

EXAMPLE 7

A mixture of 6.00 g (0.02 mole) of pure 4,4'-diaminodiphenylamine sulfate and 3.313 g (0.02 mole) of malonaldehyde bis(dimethylacetal) and 300 ml. of dimethylsulfoxide was heated to 100° C. under constant stirring. Upon complete dissolution of the two monomers, 2.188 g (0.015 mole) of trifluoromethanesulfonic acid was then added to dropwise followed by 0.978 (0.01 mole) of fluorosulfonic acid. The reaction was carried out to completion under a nitrogen atmosphere in one hour. Film samples were prepared by casting the solution on a glass slide. The slide was heated over a hot plate (80° C.) for 20 minutes. Conductivity of the film measured at room temperature was $1 \times 10^{-2}$ ohm$^{-1}$cm$^{-1}$.

EXAMPLE 8

6.00 g (0.02 mole) of pure 4,4'-diaminodiphenylamine sulfate and 3.315 g (0.02 mole) of malonaldehyde bis(dimethyl acetal) in 200 ml of dimethylsulfoxide under a nitrogen atmosphere. Steam heating (about 100° C.) and constant stirring enhanced the dissolution. Upon complete dissolution, 2.42 g (0.024 mole) of fluorosulfonic acid was added dropwise with continued heating and stirring. After 2 hours a sample was drawn by a dropper and cast on a glass slide. The slide was heated over a hot plate (80° C.) for 20 minutes. A metallic green film formed which could be peeled off the glass slide. Its electrical conductivity at room temperature (23° C.) and 0% relative humidity was $1.3 \times 10^{-3}$ ohm$^{-1}$cm$^{-1}$.

EXAMPLE 9

A mixture of 1.00 g (0.0034 mole) of pure 4,4'-diaminodiphenylamine sulfate, 0.55 g (0.0034 mole of malonaldehyde bis(dimethyl acetal) and 75 ml of dimethylsulfoxide was heated to 100° C. under constant stirring. Upon complete dissolution, 0.64 g (0.0034 moles) of para-toluene sulfonic acid was added dropwise. The reaction was carried out in nitrogen atmosphere in one hour. Film samples were prepared in the same manner as described above. The room temperature conductivity is $5\times10^{-4}$ ohm$^{-1}$cm$-1$.

The films of Examples 6-9 all had a conductivity in the semiconductor ranges, e.g., on the order of $10^{-3}$ ohm$^{-1}$ cm$^{-1}$ at 23° C. and 0% relative humidity. Because of the conducting properties of the polymeric dyes of the invention, they can also be used in electronic applications such as conductive material including semiconductor electromagnetic interference (EMI) shielding and antistatic control. As EMI sheilds, fiber-filled composites could serve as housings for circuits to prevent emission or absorption of electromagnetic radiation. For antistatic control, fibers of the new material could be used in paneling, flooring, bench tops, clothing, etc. to provide antistatic environments necessary for the electronics, explosives and grain handling industries.

EXAMPLE 10

A further polymeric dye was synthesized by adding 424 ml of dimethylformamide (DMF, liver toxin and embryotoxin) to a 500 ml resin kettle fitted with nitrogen inlet and outlet, thermometer, stirring blade and heating mantle. 12.6 g (0.0267 mole) of N,N,N',N'-tetrakis-(p-aminophenyl)-p-phenylenediamine, 4.4 g (0.0267 mole) malonaldehyde bis(dimethylacetal) and 4.0 g (0.0267 mole) trifluoromethanesulfonic acid were added with stirring at room temperature. The mixture was heated with stirring (Vapor temperature above mixture was 70°-100° C.) for 24 hours. A red, viscous solution resulted. The solution was filtered through a Membrana Inc. Dynasep Sampler I 0.2 μm-polypropylene transverse-flow filter using a Teflon ® fluoropolymer-lined compressed air-driven bellows pump. The viscosity of the filtered solution varied from 2-200 cP, depending upon the molecular weight of the polymer. It was possible to concentrate the solution by either vacuum distillation (0.20 mm Hg. 50° C.) or by dilution with DMF to obtain any desired viscosity up to about 15 Poise. The absorption maximum of this polymer in film form was 475 nm.

EXAMPLE 11

Using the same procedures as in Example 10, a similar polymer was prepared and filtered. However, to the filtered solution was added a molar excess of an oxidant, AgAsF$_6$ dissolved in DMF. The viscosity of the filtered solution was 2 cP before addition of the AgAsF$_6$/DMF solution. The absorption spectrum of films prepared from this oxidized polymer solution was 830 nm.

EXAMPLE 12

Using the same procedures as in Example 10, another polymer was prepared and filtered. However, to the filtered solution was added a molar excess of 7,7,8,8-tetracyanoquinodimethane (TCNQ). The solution changed from red to yellow-green. As described in Example 10, the solution viscosity (2-200 cP depending upon the molecular weight of the polymer) was adjustable by vacuum distillation or dilution. The absorption maximum of solution of this polymer was 830 nm.

I claim:

1. A film-forming poly (conjugated polymethine-type) dye which is the polycondensation reaction product in the presence of a strong protic acid of an aromatic polyamine and a dicarbonyl compound corresponding to the formula:

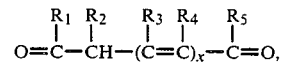

in which R$_1$ and R$_5$ are independently selected from the group consisting of —H, C$_{1-4}$ alkyl, phenyl, C$_{7-12}$ aralkyl, C$_{7-12}$ alkaryl and C$_{5-8}$ cycloalkyl and, when R$_1$ and R$_5$ are combined, C$_{2-5}$ alkylene, thus forming a C$_{5-8}$ member ring, R$_2$, R$_3$ and R$_4$ are independently selected from the group consisting of —H, C$_{1-3}$ alkyl and halogen, and χ is either 0 or an integer of 1 to 3.

2. The polymeric dye of claim 1 in which the aromatic polymamine is chromophoric.

3. The polymeric dye of claim 1 which has been formed in a highly polar aprotic solvent.

4. The polymeric dye of claim 1 in which the aromatic polyamine is thionin.

5. The polymeric dye of claim 1 in which the aromatic polyamine is N,N,N',N'-tetrakis-(p-aminophenyl)-p-phenylenediamine.

6. The polymer of claim 1 in which χ is 0 or 1.

7. The polymer of claim 1 which has been treated with an oxidant.

8. The polymer of claim 1 in which the oxidant is AgAsF$_6$.

9. The polymer of claim 1 in which χ is 0 and R$_1$-R$_5$ are —H.

10. A film of the polymer of claim 1 having a conductivity of at least about $10^{-3}$ ohm$^{-1}$ cm$^{-1}$ at 23° C. and 0% relative humidity.

11. A solution of the polymer of claim 1 in a highly polar aprotic solvent.

12. The solution of claim 11 in which the aprotic solvent is selected from the group of dimethylformamide, dimethylacetamide, dimethyl sulfoxide and N-methylpyrrolidone and mixtures thereof.

13. A process for preparing the polymer of claim 1 comprising dissolving the aromatic polyamine or a salt thereof and at least a molar equivalent of the dicarbonyl compound in a highly polar aprotic solvent and adding thereto at least one mole of strong acid for each mole of aromatic polyamine.

14. The process of claim 13 wherein a film is cast from the solution.

15. The process of claim 13 wherein the strong acid is selected from the group consisting of perchloric, fluorosulfonic, trifluoromethanesulfonic and p-toluenesulfonic and hydroiodic acids.

16. The process of claim 13 wherein the solvent is selected from the group of dimethylformamide, dimethylacetamide, dimethylsulfoxide and N-methylpyrrolidone and mixtures thereof.

17. A polyazomethine salt having the formula

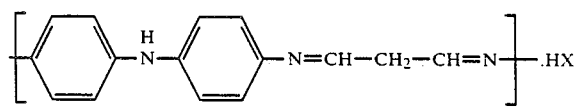

wherein HX is an acid or mixture of acids.

18. A film of the polyazomethine salt of claim 17 said film having a conductivity of at least about $10^{-3}$ ohm$^{-1}$ cm$^{-1}$ at 23° C. and 0% relative humidity.

19. A solution of the polyazomethine salt of claim 17 in a solvent selected from the group of dimethylformamide, dimethylacetamide, dimethyl sulfoxide and N-methylpyrrolidone and mixtures thereof.

20. A process for preparing a novel polyazomethine salt solution, comprising dissolving 4,4'-diaminodiphenylamine or a salt thereof and malonaldehyde bis(dimethylacetal) in a common solvent, in proportions ranging from substantially equimolar amounts up to 1.5 mole of the malonaldehyde bis(dimethylacetal) for each mole of 4,4'-diaminodiphenylamine, and adding at least about 1 mole of a strong acid for each mole of 4,4'-diaminodiphenylamine.

21. The process of claim 20 wherein a film is cast from the solution.

22. The process of claim 20 wherein the strong acid is selected from the group consisting of perchloric, fluorosulfonic, trifluoromethanesulfonic and p-toluenesulfonic acids.

23. The process of claim 20 wherein the solvent is selected from the group of dimethylformamide, dimethylacetamide, dimethylsulfoxide and N-methylpyrrolidone and mixtures thereof.

* * * * *